Oct. 13, 1931.  G. A. PRITCHARD  1,827,299
BUILT-IN VISOR FOR MOTOR CARS
Filed July 27, 1928
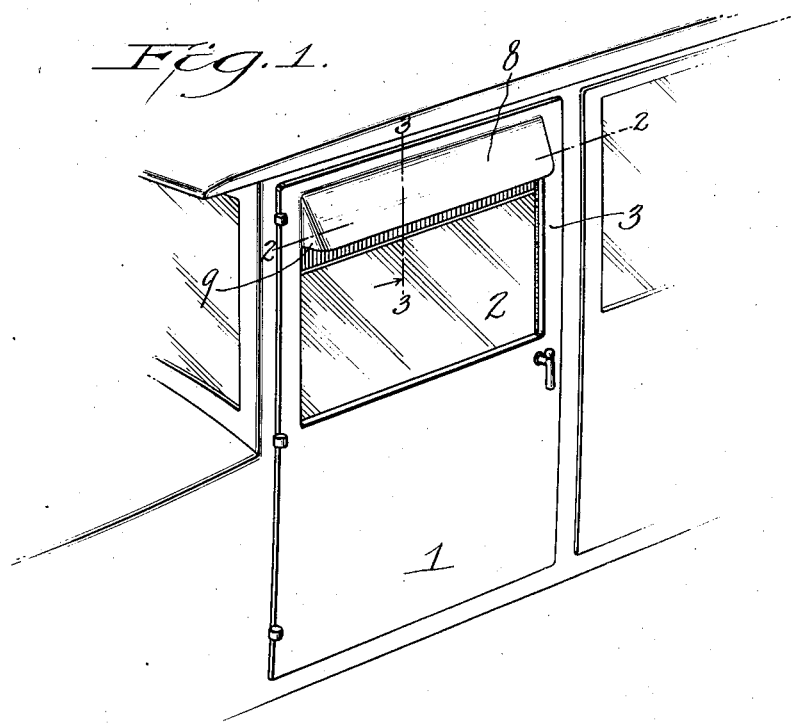
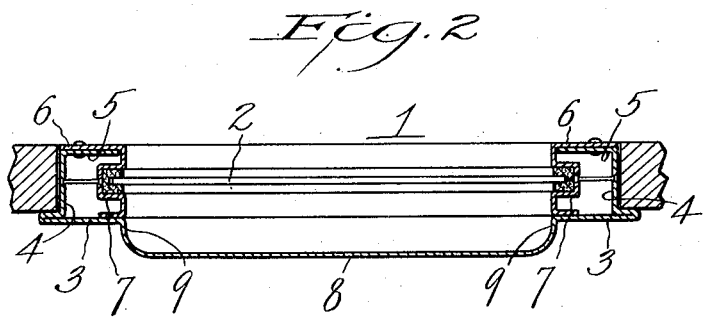
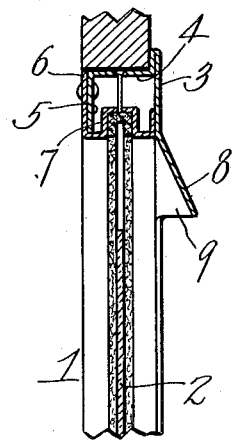
Inventor
George A. Pritchard
By his Attorney
Frederick S. Barker Patented Oct. 13, 1931

1,827,299

UNITED STATES PATENT OFFICE

GEORGE A. PRITCHARD, OF ATLANTIC BEACH, FLORIDA

BUILT IN VISOR FOR MOTOR CARS

Application filed July 27, 1928. Serial No. 295,710.

This invention relates to visors for the windows of motor cars and my improvement is directed to a visor that is "built-in" or formed integrally with the car body.

In my earlier applications Ser. No. 208,456 dated July 26th, 1927, and Ser. No. 286,619 dated June 19th, 1927, I have disclosed forms of visors capable of removable attachment to motor car windows, but my present invention contemplates the inclusion of visors for the windows in the process of pressing out the sheet metal from which car bodies and doors are made, the expense involved being slight in thus adding this useful feature to a car during production.

Other features and advantages of my invention will hereinafter appear.

In the drawings

Figure 1 is a partial side perspective view of a motor car provided on a door with my improved built-in visor;

Fig. 2 is a horizontal section on the line 2—2 of Fig. 1 and

Fig. 3 is a vertical section on the line 3—3 of Fig. 1.

In the example of my invention herein illustrated, I have shown the visor as formed integrally with the window frame of a car door, but it is to be understood that other windows of a car may be similarly provided with built-in visors.

Let 1 indicate a car door, having a window frame with sliding glass 2 therein. The door indicated is formed of pressed sheet metal having the front plate 3 angled in boxlike form 4, 5, at the sides and top, and a back plate 6, angled at 7 to provide the grooves for the glass 2, said plates 3 and 6 being riveted together.

This construction of a pressed sheet metal door is referred to in an arbitrary sense only and not as intended to limit my invention to such construction.

My improved visor comprises the forward, downwardly inclined portion 8 and side portions 9 pressed out from the front plate 3 near the top thereof, to form an overhung curtain that shades the sun's rays and permits circulation of air through the car with the glass drawn up to a point near or above the lower edge of the visor.

This visor formation is typical of my invention whether it be formed from the outer metallic sheet of a motor car door or window frame.

It will be appreciated that my invention is not to be limited to the degree of outward flare given the visor and in fact the visor may be regarded as effective when no flare is employed and the material forming the visor extends clearingly outside the window.

Variations within the spirit and scope of my invention are equally comprehended by the foregoing disclosure.

I claim:

In a window frame construction having a sliding glass therein, a front plate angled to present the sides and top of the frame and a back plate secured to one of the sides of said front plate and being angled to provide grooves for the glass and to form the bottom of the frame, one side of said front plate presenting a downwardly inclined portion having side portions to form a curtain overhanging the window opening.

Signed at New York, in the county and State of New York, this 25th day of July, 1928.

GEORGE A. PRITCHARD.